United States Patent [19]

Cornelissen et al.

[11] 4,322,624
[45] Mar. 30, 1982

[54] X-RAY TUBE HAVING A MAGNETICALLY SUPPORTED ROTARY ANODE

[75] Inventors: Gerardus A. A. F. Cornelissen; Hendrik J. Gerrits; Evert M. H. Kamerbeek, all of Eindhoven, Netherlands

[73] Assignee: U.S. Philips Corporation, New York, N.Y.

[21] Appl. No.: 129,135

[22] Filed: Mar. 10, 1980

[30] Foreign Application Priority Data

Mar. 30, 1979 [NL] Netherlands .......................... 7902477

[51] Int. Cl.³ .............................................. H05G 1/70
[52] U.S. Cl. ..................................... 250/406; 250/402
[58] Field of Search ................... 250/406, 402; 313/60

[56] References Cited

U.S. PATENT DOCUMENTS

| | | | |
|---|---|---|---|
| 3,619,696 | 11/1971 | DeLucia | 313/60 |
| 3,878,395 | 4/1975 | Seifert et al. | 250/406 |
| 4,081,707 | 3/1978 | Hartl et al. | 313/60 |
| 4,141,606 | 2/1979 | Yamamura | 313/60 |

Primary Examiner—Bruce C. Anderson
Attorney, Agent, or Firm—Marc D. Schechter

[57] ABSTRACT

The invention relates to an X-ray tube. The tube has a rotary anode which is rotatably journalled by means of a magnetic bearing having a stator comprising a magnet yoke which intersects the outer walls of the tube and which is magnetizable by magnets arranged outside the tube. The magnet yoke comprises radially extending pole faces which enclose gaps in conjunction with radially extending pole faces of a rotor connected to the rotary anode. The rotor consists of a soft-magnetic disk, which provides the magnet yoke which closes the magnet yoke of the stator.

5 Claims, 5 Drawing Figures

X-RAY TUBE HAVING A MAGNETICALLY SUPPORTED ROTARY ANODE

BACKGROUND OF THE INVENTION

The invention relates to an X-ray tube having a shaft supporting a rotary anode. The shaft is rotatably journalled by means of a magnetic bearing comprising a rotor connected to the rotary anode and a stator having one or more magnet yokes. Each magnetic yoke intersects the envelope of the tube and is magnetizable by a magnet outside the tube. Each magnetic circuit of the bearing includes gaps between opposed, axially-spaced annular faces disposed on the rotor and on the yoke, respectively, so as to extend transverse to of the shaft.

Such an X-ray tube is particularly suitable for use as the radiation source in medical X-ray diagnosis apparatus.

German Patent Application No. 2,262,757, which corresponds to U.S. Pat. No. 3,878,395, discloses an X-ray tube as described above in which the magnet yoke of the stator comprises a plurality of flat stator rings which extend transverse to the shaft. The rotor comprises a plurality of flat rotor rings which also extend transvese to the shaft. The inside diameter of the stator rings is smaller than the outside diameter of the rotor rings. The rings are arranged such that facing portions of neighboring stator and rotor rings have cooperating faces which are separated by axial gaps. Magnetic flux of magnets arranged outside the tube can penetrate into the interior through these gaps, axial attractive forces are exercised on the rotor, however, these forces are oppositely directed in neighboring gaps. Due to these forces, the rotor is an axial equilibrium which is, however, unstable. The dimensions of the gaps, and consequently the position of the rotor, are kept constant in the axial direction of the shaft by stabilizing this unstable equilibrium. This is achieved by means of an axial journal or ball bearing, so that the rotary anode is axially supported.

Furthermore, the rotor rings have their inner edges arranged axially opposite outer edge of flat rings. These flat rings constitute magnet yokes of magnets which are secured inside the tube and which have been magnetized so that repelling forces are exercised on the rotor rings which are magnetized by the magnets disposed outside the tube. As a result of these repelling forces, the rotor is in stable radial equilibrium, so that the rotary anode is radially supported as well as axially supported.

A great number of components is necessary to obtain adequate support, particularly radial support, of the rotary anode within this known X-ray tube. The specification describes the use of eight stator rings with seven field coils which are disposed outside the tube between the stator rings, eight rotor rings, and eight rings arranged inside the tube and having seven field coils disposed therebetween. These components must be accurately positioned relative to one another within the X-ray tube, which results in a relatively expensive construction. This X-ray tube has the further drawback that the magnetic bearing forces are partly produced by field coils which are fixed inside the tube. During operation of the X-ray tube, these field coils attain a temperature of between 200° C. and 500° C., and will therefore release gas, particularly from the insulating means between the wires, and consequently adversely affect the tube vacuum.

SUMMARY OF THE INVENTION

An object of the invention is to provide an X-ray tube which mitigates the above-mentioned drawbacks. According to the invention an X-ray tube as described above opening paragraph is characterized in that the rotor is a single soft-magnetic disk-shaped member. In addition the bearing has a first magnetic circuit comprising two gaps between two faces on the rotor facing in the same axial direction and two respectively opposed faces on the poles of a first yoke. At least one of the two faces on the rotor and the yoke pole face opposed thereto each has the same pattern of a plurality of axially-extending annular portions radially separated from one another by one or more grooves concentric with the shaft.

The great number of bearing components within the above-described known X-ray tube has been replaced by a single soft-magnetic disk-shaped member according to the invention. This not only limits the number of bearing components but also mitigates another above-mentioned drawback; the soft-magnetic member will not release much gas with an increase in its temperature.

Attractive forces are exercised on the rotor, according to the invention by the stator yoke, which is magnetized by the magnets arranged outside the tube. These attractive forces act between corresponding axially-extending annular portions of the stator and the rotor, which are therefore accurately axially aligned, so that the rotary anode is then radially supported.

The axial dimensions of the gaps between the rotor and the stator are not stable per se but can be stabilized in operation, for example by means of a second, similar bearing connected to the shaft. Since the rotor comprises a soft-magnetic disk, one side of which comprises two annular pole faces, this second bearing can be positioned so that oppositely-directed, axial attractive forces, which can be influenced independently from one another by controlling the strength of at least one of the magnets outside the tube, are exercised on the respective rotors of the two bearings. By controlling the attractive forces, the gap dimensions can be stabilized at desired values.

It should be noted that German Patent Specification No. 2,451,972 discloses a magnetic radial bearing having an annular soft-magnetic rotor with faces which extend transverse to the axis of rotation. These faces are separated by gaps from pole faces, which also extend transverse to the axis of rotation, of a stator magnet yoke. The rotor has a face on each axial side on which the stator magnet exercises substantially equal attractive forces. The magnitudes of these attractive forces are substantially independent of the relative axial position of the rotor and the stator. Therefore, even if a second, similar bearing connected to the same shaft is used, the bearing is substantially not stabilizable in the axial direction by controlling the strength of the stator magnet.

A preferred embodiment of the invention is characterized in that the first yoke is magnetizable by a first magnet of predetermined strength outside the tube. The first yoke comprises a portion further magnetizable by an electromagnet outside the tube. The bearing also has a second magnetic circuit comprising two gaps. One gap is adjacent a first of the two faces of the rotor and the second gaps is adjacent a third face on the rotor. The first and third faces facing in opposite axial directions. The gaps are between these first and third faces and two respectively opposed pole faces on the yoke portions. In the two gaps which are bounded by the first pair of faces of the rotor, the magnet of predetermined strength generates oppositely-directed, constant axial magnetic fields; the electromagnet generates variable axial magnetic fields directed in the same direction. When the field of the electromagnet is changed, the total field strength and, consequently, the attractive force on the rotor decreases in one of the gaps, and the total field strength and consequently the attractive force on the rotor increases in the other gap. As the first pair of pole faces is located on either side of the soft-magnetic member, the axial position of the rotor can be controlled by means of the variable fields generated by the electromagnet. The rotor position is axially stabilizable by means of relatively small fields with relatively small control currents. It can be stabilized in a desired position in or near an, in itself unstable, equilibrium of forces on the rotor. These forces are those generated by the permanent magnets of predetermined strength.

It should be noted that German Patent Specification No. 2,501,218, which corresponds to U.S. Pat. No. 3,976,339, discloses a magnetic bearing which is stabilizable in a normally unstable axial equilibrium. The bearing has a rotor and a stator comprising a magnet yoke which is magnetizable by means of a permanent magnet. The stator further comprises annular pole faces which extend transverse to the axis of rotation and are axially separated by gaps from faces of the rotor which similarly extend transverse to of the axis of rotation. The rotor here comprises three soft-magnetic disks which are connected to a shaft and are interconnected near the shaft. The center disk has on each side thereof, and the two outer disks have on their sides facing the center disk, near their edges, annular faces. The bearing is not so suitable for incorporation in an X-ray tube not only because the rotor has a complicated shape, but particularly because field coils are arranged inside the spaces between the disks, the gaps and the shaft. These coils would, after incorporation of the bearing in an X-ray tube, be located inside the tube and would then adversely affect the tube vacuum during operation.

A further preferred embodiment of the invention is characterized in that the bearing includes a second magnetic yoke which is magnetizable by a second magnet outside the tube of predetermined strength substantially equal to that of the first magnet. The bearing has a third magnetic circuit comprising two gaps between the third and fourth faces on the rotor, the third and fourth faces facing in the same axial direction, and two respectively opposed faces on the poles of the second yoke. In operation the magnetic fields produced respectively by the first and second magnets in the gaps between the faces of the rotor and the respectively opposed faces of the magnetic yokes are in opposite axial directions. The rotor can be stabilized in or near an, in itself unstable, equilibrium of forces which are generated by the magnets of predetermined strength by means of relatively small variable fields generated by the electromagnet.

DESCRIPTION OF THE PREFERRED EMBODIMENTS

Figure 1:
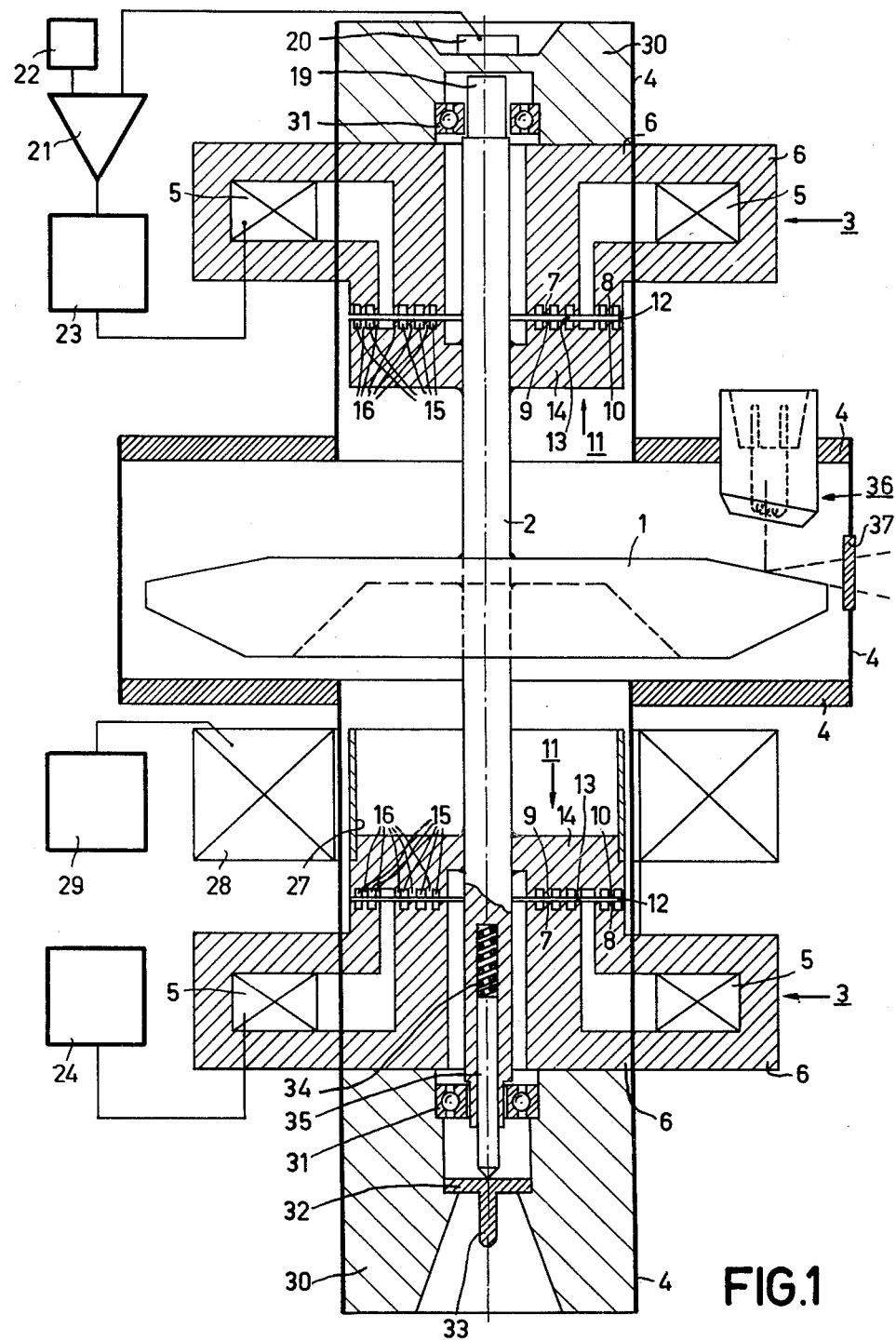
FIG. 1 is a longitudinal cross-sectional view of an X-ray tube embodying the invention having two-sided journalling of the rotary anode.

Referring to FIG. 1, there is shown an X-ray tube embodying the invention having a shaft 2 supporting a rotary anode 1 secured thereto. The shaft is journalled on each side of the anode by means of a respective magnetic bearing. Each bearing comprises a stator 3 comprising a magnet yoke 6 which intersects a portion of the envelope 4 of the tube and which is magnetizable by field coils 5 outside the tube. Each magnet yoke 6 has two radially spaced, coplanar annular pole faces 7 and 8 extending transverse to the shaft 2 and axially spaced by gaps 12 and 13 from annular pole faces 9 and 10 of rotor 11. Faces 9 and 10 are radially spaced and extend transverse to the shaft 2. Rotor 11 is connected to the rotary anode 1 by the shaft 2. The rotor 11 is a soft-magnetic disk-shaped member 14 which is connected to the shaft 2 and which bridges the pole faces 7 and 8 of the magnet yoke 6 to form a magnetic circuit therewith. The pole faces 9 and 10 of the rotor 11 and the pole faces 7 and 8 of the stator have axially-extending annular portions 16 which are radially separated from one another by grooves 15 concentric with the shaft 2.

Attractive forces are exercised on the soft-magnetic member 14 by yoke 6 of the stator 3, which is magnetized by the field coil 5 outside the tube. These attractive forces act between corresponding annular portions 16 of the pole faces 7 and 8 of the stator 3 and of pole faces 9 and 10 of the rotor 11, which are thus accurately aligned with one another so that the rotary anode 1 is radially positioned and supported. Since the attractive forces act on the two rotors 11 in opposite axial senses, the axial dimensions of the gaps 12 and 13 can be kept constant by controlling the degree of magnetization of the magnet yokes 6. As a result of this, the rotary anode is also axially positioned and supported.

To this end, the axial position of the upper end 19 of the shaft 2 is sensed during operation by means of a transducer 20 outside the tube. A position signal generated by the transducer 20 is subtracted, in a differential amplifier 21, from a signal which is generated by a separate generator 22. The signal from generator 22 is equal to the signal the transducer generates when the shaft is in the desired axial position. The output signal of the differential amplifier 21 is fed to a control circuit 23 which supplies current to the field coil 5 of the stator 3 shown in the top half of the drawing. The field coil 5 of the stator 3 shown in the lower half of the drawing is connected to a source 24 which produces a fixed current of a predetermined value.

In addition to the magnetic bearings, the X-ray tube comprises two ball bearings 31 which are connected to the tube wall 4 by means of insulators 30 and which, when the magnetic bearings are not energized, support the shaft 2 in such a manner that the faces 9, 10 and 7, 8 of the rotor 11 and the stator 3, respectively, do not touch each other. The insulator 30 in the lower half of the drawing comprises a metal feedthrough 32 having a pin 33 to which the tube voltage supply can be connected. By means of a pin 35, which is urged against the feedthrough 32 by a helical spring 34 inside the shaft 2, this voltage is fed to the rotary anode 1. Electrons are accelerated from a cathode device 36 bombard anode 1 so as to generate a beam of X-rays which can leave the tube through a window 37 in the tube wall. In operation, the rotary anode 1 is rotated by means of an electric motor having an annular rotor 27 which is connected to the shaft 2 and is driven by a rotating magnetic field generated by a coil system 28 connected to a supply source 29.

It should be noted that the lower magnet yoke 6 may, instead of being magnetized by the field coil 5 which is connected to the power source 24, alternatively be magnetized by a permanent annular magnet.

Figure 2:
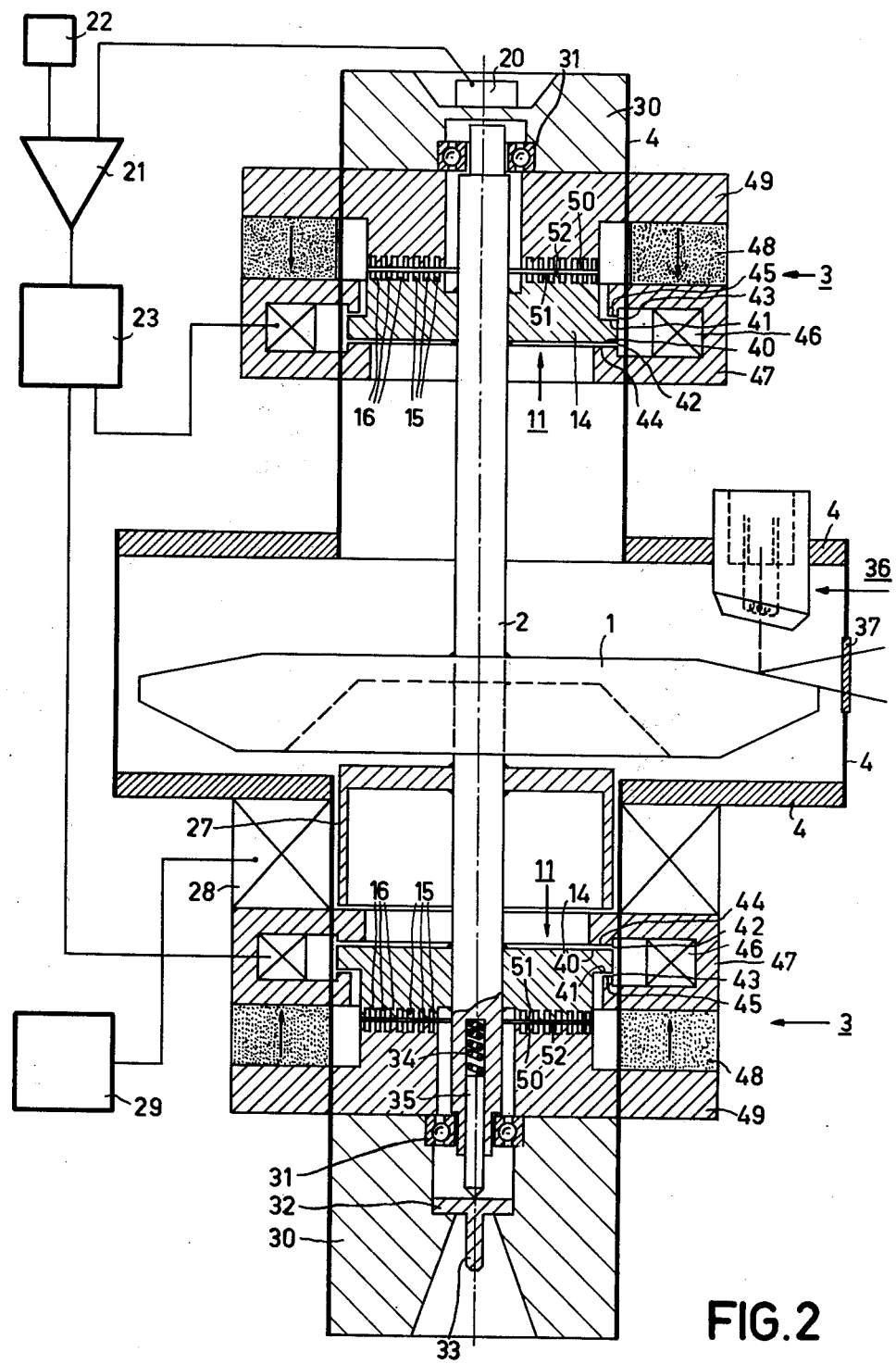
FIG. 2 is a longitudinal cross-sectional view of a preferred embodiment of the invention having two-sided journalling of the rotary anode.

FIG. 2 shows a preferred embodiment of the invention having two-sided journalling of the rotary anode, corresponding components having the same reference numerals as in FIG. 1. The soft-magnetic member 14 has a pair of faces 40 and 41 which are located on opposite sides of a flanged portion of the rotor 11 and which are axially spaced by gaps 42 and 43 from pole faces 44 and 45 of a magnet yoke portion 47 which is magnetizable by a magnet-coil 46 outside the tube. The magnet yoke portion 47 forms part of a magnet yoke 49 which is magnetizable by a permanent magnet 48 outside the tube. The yoke 49 comprises a pole face 50 which is axially separated by gap 52 from an annular face 51 located on the lower side of the soft-magnetic member 14.

In the gaps 42 and 43 the permanent magnet 48 generates oppositely-directed, constant axial magnetic fields. The electromagnet 46, however, generates variable axial magnetic fields directed in the same direction. When the field of the electromagnet 46 is changed, the total field strength and consequently the attractive force on the rotor decreases in one of the gaps 42 and 43. The total field strength and consequently the attractive force on the rotor increases in the other gap. Since the gaps 42 and 43 are located on opposite sides of the soft-magnetic member 14, the axial position of the rotor 11 can be influenced by means of the variable fields generated by the electromagnet 46. This axial position can be stabilized with relatively small fields—and consequently with relatively small control currents—to form an equilibrium of the attractive forces acting on the rotor owing to the magnetic fields in the three gaps 42, 43 and 52. To this end the axial position of the shaft 2 is sensed, during operation, by means of the transducer 20. The position signal produced by transducer 20 is subtracted, in the differential amplifier 21, from the signal generated by the generator 22. The signal being equal to the signal produced by the transducer 20 when shaft 2 is in the desired axial position. The output signal of the differential amplifier 21 is applied to the control circuit 23 which controls the current in both field coils 46.

Figure 3:
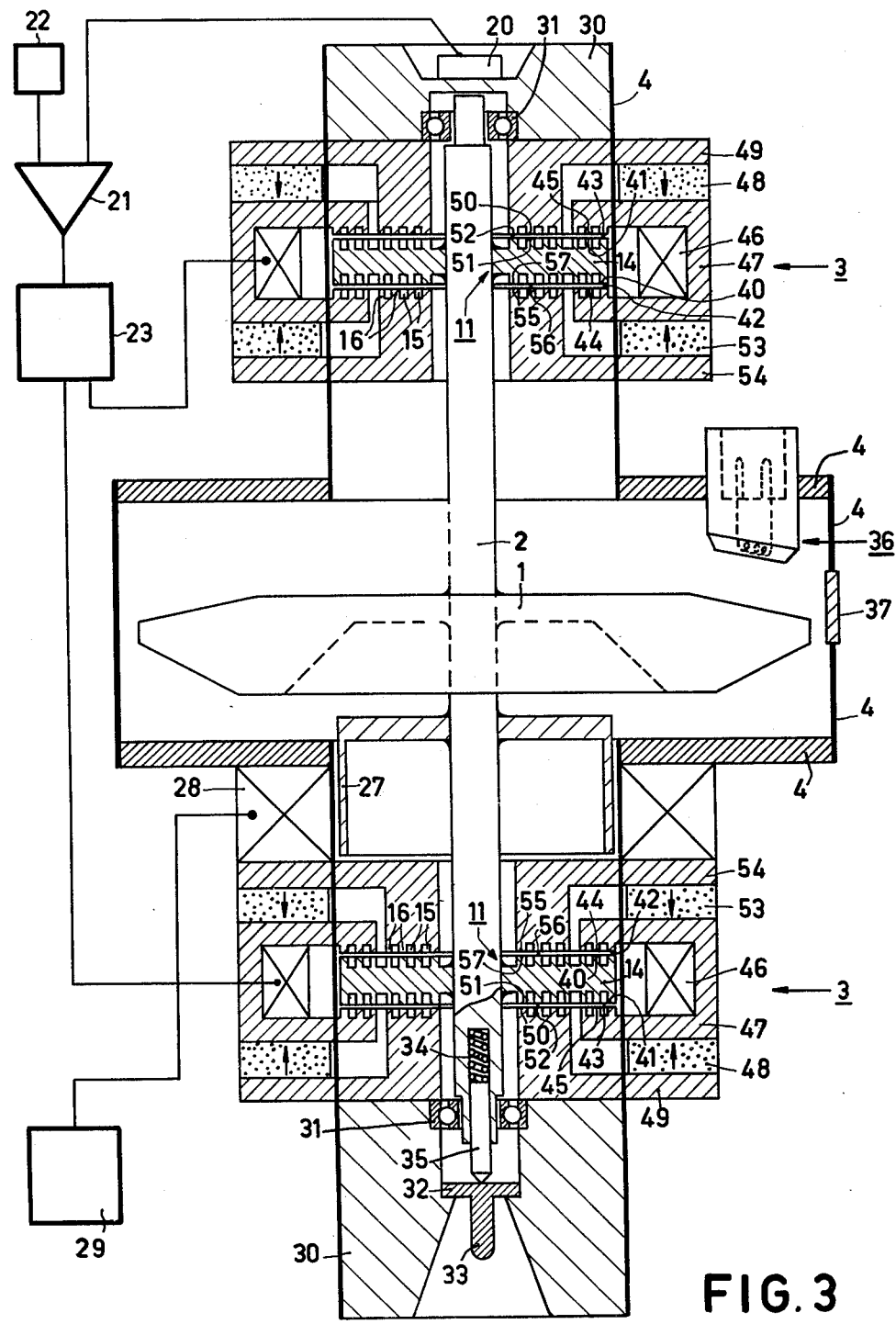
FIG. 3 is a longitudinal cross-sectional view of a further preferred embodiment of the invention having two-sided journalling of the rotary anode.

FIG. 3 shows a further preferred embodiment of the invention having two-sided journalling of the rotary anode, corresponding components having the same reference numerals as in FIG. 2 (as appropriate). The magnet yoke section 47, which can be magnetized by the field coil 46 also forms part of a second magnet yoke 54 which can be magnetized in the opposite axial sense to magnet 48 by a second permanent magnet 53. Magnet 53 is of substantially the same strength as the magnet 48 and is similarly arranged outside the tube. The magnet yoke 54 comprises a pole face 55 which is axially spaced by a gap 56 from a fourth annular face 57 of the rotor 11. The face 51 and the fourth face 57 of the rotor 11 form a pair of faces which are located one on each side of the soft-magnetic member 14. Both sides of the soft-magnetic member 14 have been provided with a pattern of axially extending annular portions.

Figure 4:
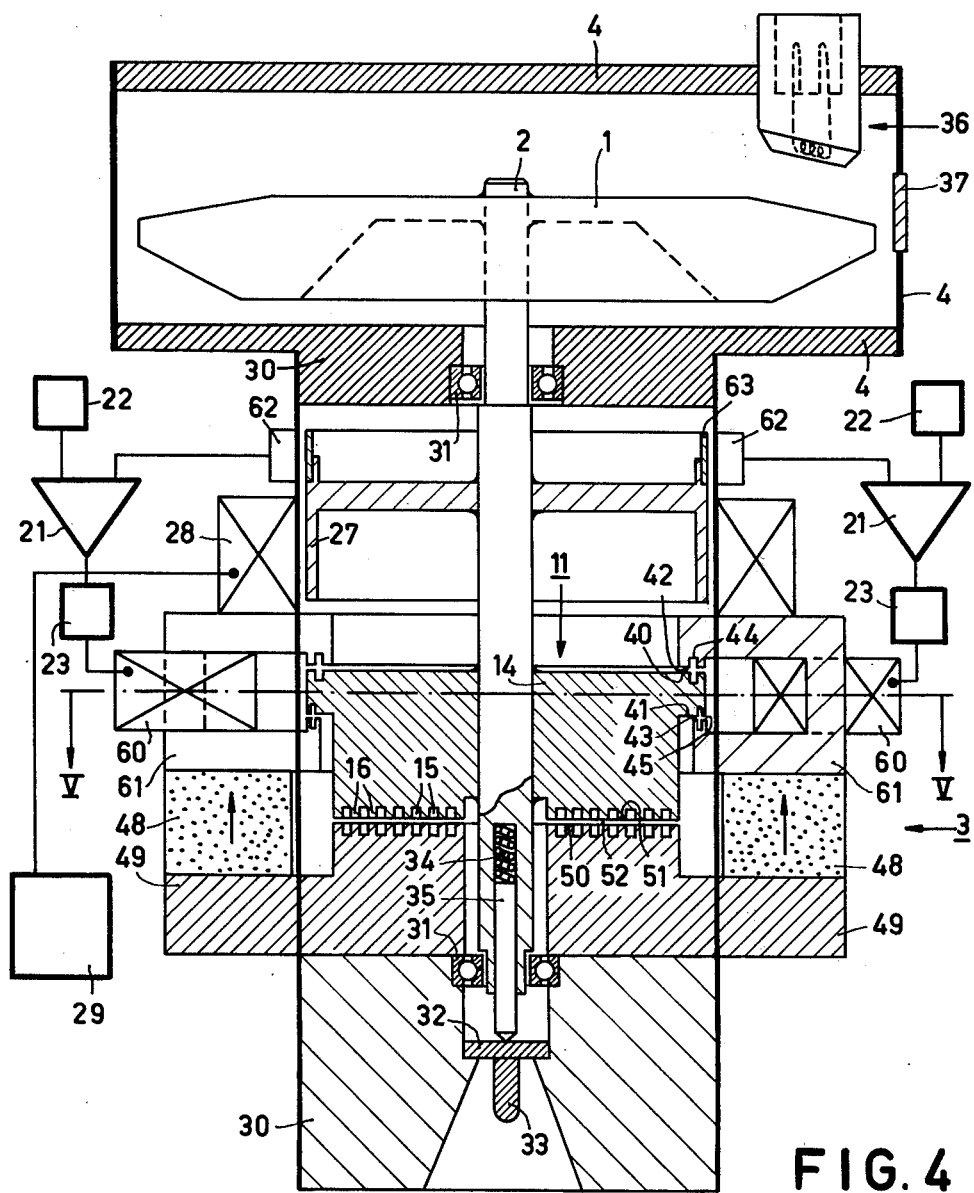
FIG. 4 is a longitudinal cross-sectional view of an X-ray tube embodying the invention having one-sided journalling of the rotary anode.
Figure 5:
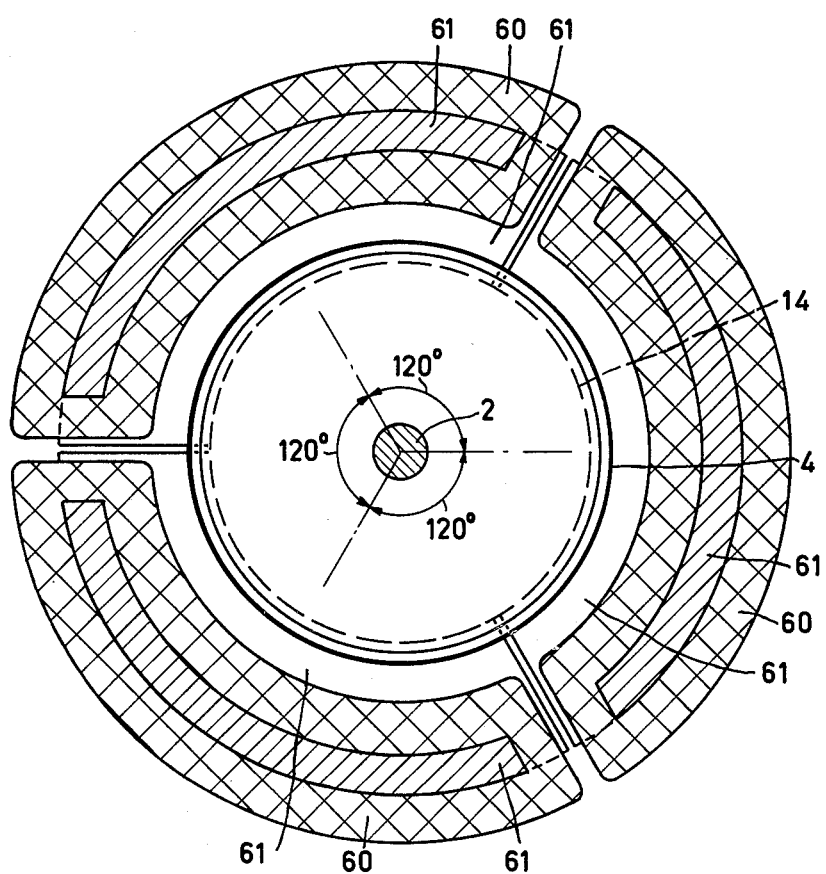
FIG. 5 is an axial cross-sectional view on the line V—V of the X-ray tube shown in FIG. 4.

FIGS. 4 and 5 are longitudinal and axial cross-sectional views, respectively, of an X-ray tube according to the invention having a single magnetic journal for the rotary anode, corresponding components having been given the same reference numerals as in FIGS. 1 and/or 2 (as appropriate). The first pair of faces 40 and 41 of the rotor 11 are axially spaced by gaps 42 and 43 from three magnet yoke segments 61. Segments 61 are spaced at intervals of 120° around the shaft 2 and are magnetizable by respective electromagnets 60 outside the tube. The three yoke-segments constitute part of the magnet yoke 49, which is magnetizable by the permanent magnet 48 outside the tube.

In operation, the position of the shaft 2 is controlled by means of the three field coils 60. The axial position of a ring 63 connected to the shaft 2 is sensed by means of three transducer elements 62 which are also spaced at intervals of 120° around the shaft. The position signals are subtracted in three differential amplifiers 21 from signals which are received from three generators 22, respectively. Signals 22 are equal to the signals supplied by the transducer elements 62 when the shaft 2 is in the desired position. The output signals of the differential amplifiers 21 are applied to respective control circuits 23 which supply current to the respective field coils 60.

The ratios of the surface areas of the pole faces 50, 42 and 43, respectively, are preferably $1:\frac{3}{4}:\frac{1}{4}$. This causes an equilibrium of attractive forces on the rotor, when the axial gaps 42 and 43 are substantially equal. Only a minimum control current through the field coils 60 is required to stabilize the rotor in this axial position.

What is claimed is:

1. A rotary anode type X-ray tube comprising:
   a tube envelope;
   a shaft having an axis;
   an anode, attached to the shaft; and
   a magnetic bearing for rotatable journaling the shaft within the envelope of the X-ray tube, said magnetic bearing comprising:
   a rotor, attached to the shaft, said rotor having at least a first face extending transverse to the shaft; and
   a stator having at least one magnetic yoke which intersects the envelope of the tube, said yoke being magnetizable by a magnet outside the tube envelope, said yoke having at least one face extending transverse to the shaft, said yoke face being axially spaced from said first rotor face by a gap; characterized in that:
   the first rotor face comprises two pole faces;
   the yoke face comprises first and second pole faces arranged opposite the rotor pole faces, there being a pole gap between each opposing yoke pole face and rotor pole face;
   the magnetic bearing forms a first magnetic circuit with the rotor, yoke and the pole gaps; and
   at least one rotor pole face and the yoke pole face opposite thereto each have a like pattern of a plurality of axially-extending annular portions which are radially separated from one another by grooves which are concentric with the shaft.

2. An X-ray tube as claimed in claim 1, characterized in that:
- the rotor has a second face extending transverse to the shaft, said second rotor face facing in an opposite axial direction as compared to said first rotor face;
- the stator yoke has a third pole face arranged opposite the second rotor face, there being a gap between these opposing faces; and
- a second magnetic circuit is formed between the second and third yoke pole faces, the opposing rotor faces, and the gaps therebetween.

3. An X-ray tube as claimed in claim 2, characterized in that the first magnetic circuit is energized by a fixed strength magnet and the second magnetic circuit is energized by a variable strength electromagnet, each magnet being arranged outside the tube envelope.

4. An X-ray tube as claimed in claim 1, characterized in that:
- the rotor has a second face extending transverse to the shaft, said second rotor face facing in an opposite axial direction as compared to said first rotor face, said second rotor face having two pole faces;
- the stator yoke has third and fourth pole faces arranged opposite the pole faces of the second rotor face, there being a pole gap between each opposing yoke pole face and rotor pole face;
- a second magnetic circuit is formed between the second and third yoke pole faces, the opposing rotor faces, and the gaps therebetween; and
- a third magnetic circuit is formed between the third and fourth yoke pole faces, the opposing rotor faces, and the gaps therebetween.

5. An X-ray tube as claimed in claim 4, characterized in that the first and third magnetic circuits are energized by fixed strength magnets and the second magnetic circuit is energized by a variable strength electromagnet, each magnet being arranged outside the tube envelope.

* * * * *